(12) United States Patent
Erne et al.

(10) Patent No.: US 7,259,842 B2
(45) Date of Patent: Aug. 21, 2007

(54) OPTICAL INCLINOMETER

(75) Inventors: Kurt Erne, Nenzing (AT); Kurt Giger, Rüthi (CH)

(73) Assignee: Leica Geosystem AG, Heerbrugg (CH)

( * ) Notice: Subject to any disclaimer, the term of this patent is extended or adjusted under 35 U.S.C. 154(b) by 0 days.

(21) Appl. No.: 10/516,730

(22) PCT Filed: May 17, 2003

(86) PCT No.: PCT/EP03/05206

§ 371 (c)(1),
(2), (4) Date: Jan. 10, 2005

(87) PCT Pub. No.: WO03/104748

PCT Pub. Date: Dec. 18, 2003

(65) Prior Publication Data

US 2005/0225748 A1    Oct. 13, 2005

(30) Foreign Application Priority Data

Jun. 7, 2002    (CH) ..................................... 0956/02

(51) Int. Cl.
*G01B 11/26* (2006.01)
(52) U.S. Cl. ................................................ 356/139.1
(58) Field of Classification Search ............. 356/139.1
See application file for complete search history.

(56) References Cited

U.S. PATENT DOCUMENTS

| 5,781,286 A | * | 7/1998 | Knestel ................. 356/139.09 |
| 5,794,355 A | | 8/1998 | Nickum |
| 6,141,091 A | * | 10/2000 | Ball ........................... 356/146 |
| 2004/0021099 A1 | * | 2/2004 | Figueria et al. ........ 250/559.37 |

FOREIGN PATENT DOCUMENTS

| CH | 1491855 | * | 5/2003 |
| CH | 14911855 | * | 5/2003 |
| DE | 36 39 284 A1 | | 5/1988 |
| DE | 19854812 | * | 8/1998 |
| DE | 198 54 812 A1 | | 8/1999 |
| EP | 0 908 699 A2 | | 4/1999 |
| JP | 01-109206 A | | 4/1989 |

* cited by examiner

Primary Examiner—Thomas H. Tarcza
Assistant Examiner—Luke Ratcliffe
(74) Attorney, Agent, or Firm—Oliff & Berridge, PLC

(57) ABSTRACT

The invention relates to an optical inclinometer, in which radiation is emitted form a radiation source. After passing through a receptacle containing at least one first medium, said radiation is reproduced in a camera. Information concerning the inclination of the inclinometer can be gathered from the position of the first medium, in particular a liquid level, in relation to the inclinometer or the camera. The recording of the position of the first medium by a camera permits the evaluation of a plurality of characteristics, in particular the form, dimension and position of a boundary layer.

30 Claims, 4 Drawing Sheets

Figure 1:
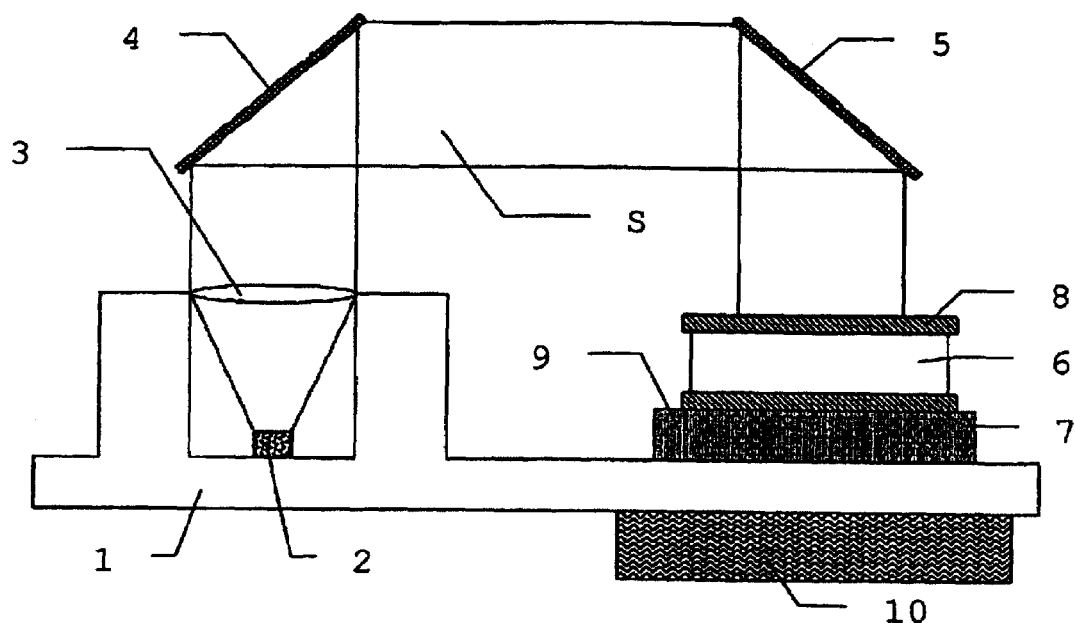

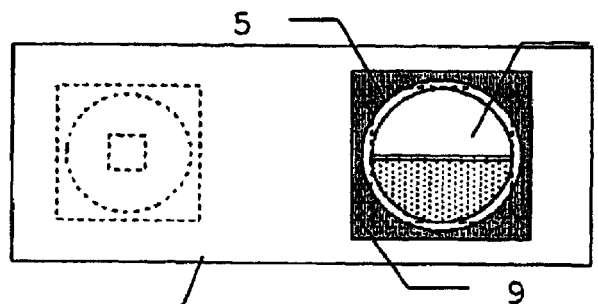
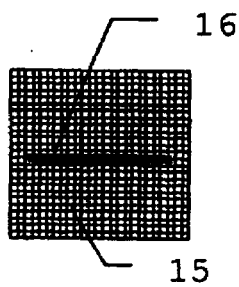
Fig. 3a    Fig. 3b    Fig. 3c
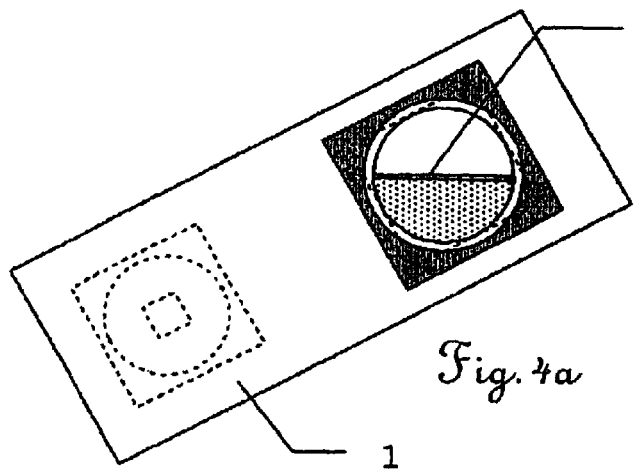
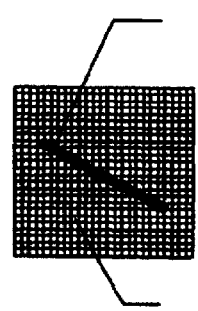
Fig. 4a    Fig. 4b    Fig. 4c
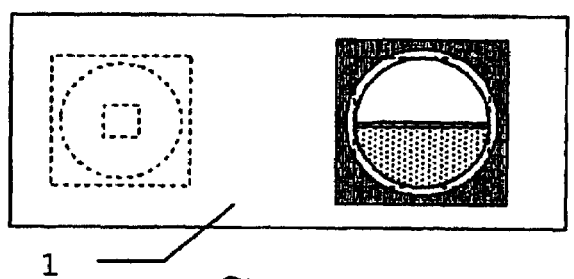
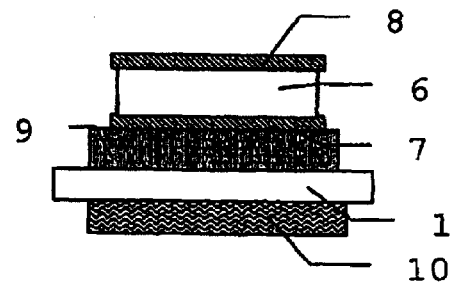
Fig. 5a    Fig. 5b
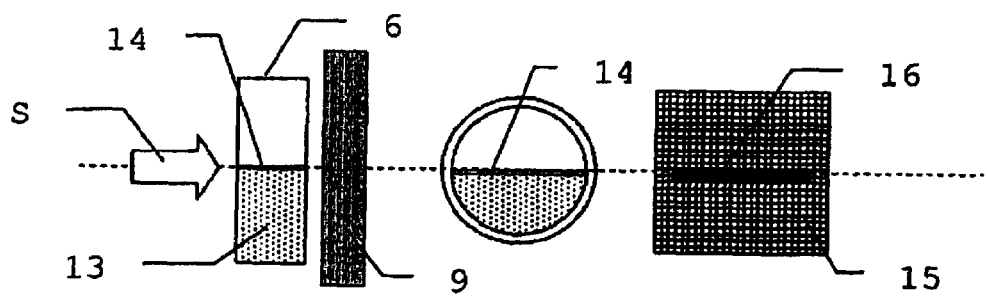
Fig. 5c    Fig. 5d    Fig. 5e

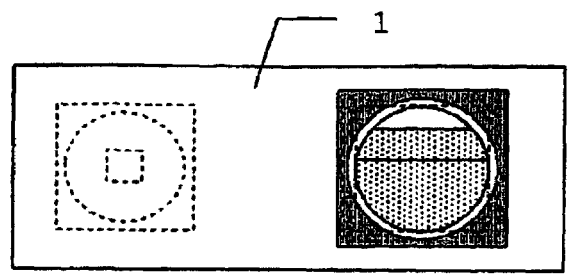
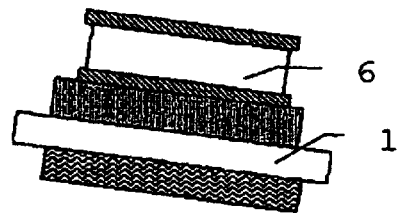
Fig. 6a　　　　　　Fig. 6b
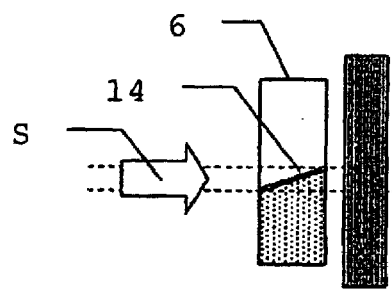
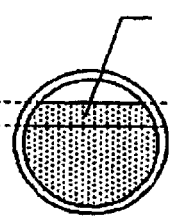
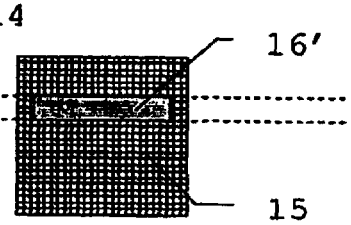
Fig. 6c　　　Fig. 6d　　　Fig. 6e
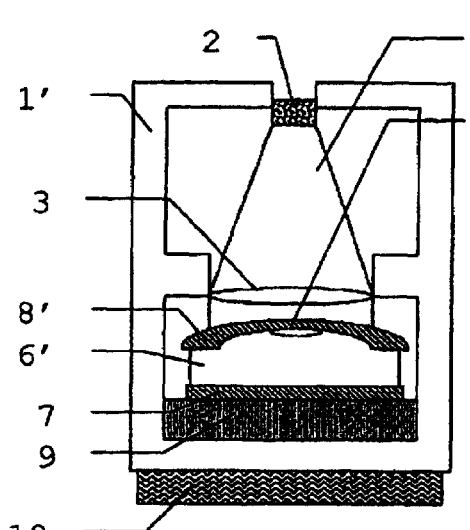
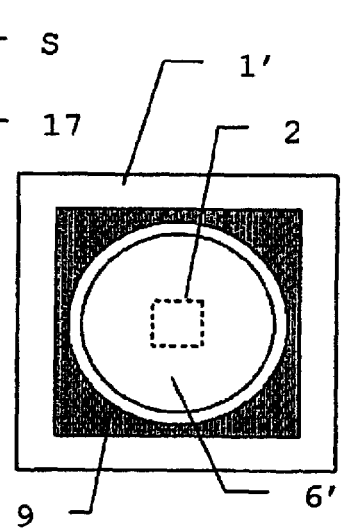
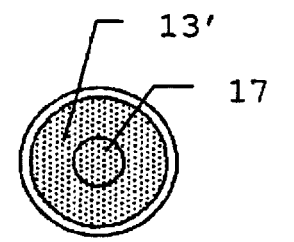
Fig. 7c
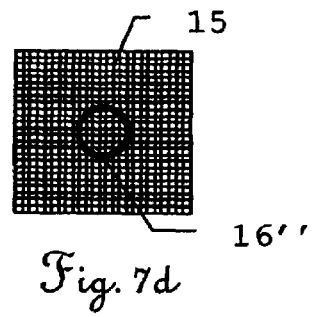
Fig. 7a　　　　Fig. 7b　　　　Fig. 7d

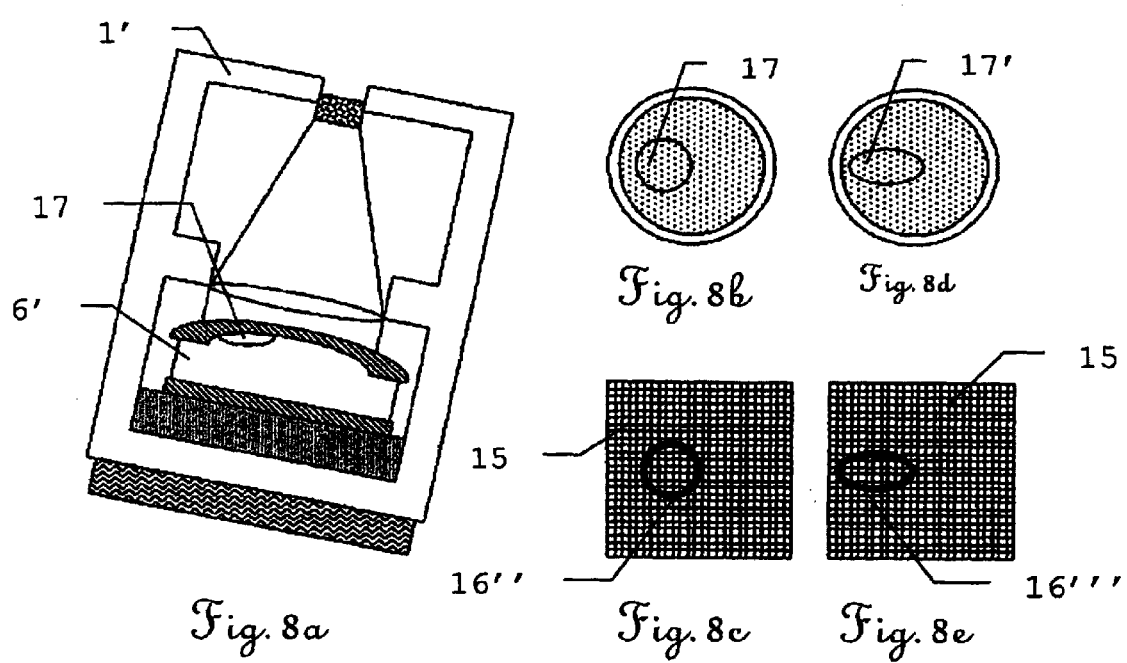

OPTICAL INCLINOMETER

The invention relates to an optical inclinometer according to the preamble of claim 1, a method for measuring the inclination of a device according to preamble of claim 17 and a geodetic device having such an inclinometer.

Inclinometers of various designs have long been used in all areas where the position of a device has to be taken into account. This is true in particular for measurements in the geodetic area or in the building trade.

While various forms for realization with a complex structure are known for high-precision measurements, there has to date been a lack of simple and robust inclinometers which nevertheless have sufficient accuracy.

U.S. Pat. No. 5,392,112 describes an inclinometer which divides a light beam into two part-beams which, after respective reflection by a fixed surface of the device and a liquid surface, are focused on a detector and registered there. The angle of inclination of the device is deduced from the relative position of the space points of both part-beams.

DE-A 41 10 858 discloses a two-axis inclinometer in which a geometrical figure is projected via an inclination-sensitive and beam-deflecting sensor onto a linear array. The sensor contains a liquid whose position relative to the device results in an effect on or deflection of the projection of the figure on the linear array.

In addition to the disadvantages arising through the complexity of the design with imaging optical systems and optionally beam splitters, inclinometers of these designs can be miniaturized only to a limited extent owing to the required minimum lengths of the beam paths for both part-beams.

JP 09243359 describes a simple inclinometer which has a sealed, liquid-filled vessel. An inside of the vessel has an outward-curving surface in which a mercury drop rests. The vessel and the liquid present therein are illuminated by a light source and the light radiation is registered by a detector comprising four photodiodes as a simple quadrant sensor. The inclination of the sensor can be deduced from the position of the shadow caused by the mercury drop. Owing to this design, it is not possible to make use of any information of the darkening of the photodiodes which is produced by the casting of a shadow. In particular, it is not possible to take into account the exact position of the bright-dark transition on the detector.

The prior art discloses high-precision and well developed inclinometers which, however, owing to their complexity and design of the generic type, cannot be reduced in size without considerable effort. On the other hand, there are simple solutions which, however, are very limited with regard to the information available for determining the inclination and therefore rather permit a coarse estimate of the inclination.

The objects of the present invention are to provide an optical inclinometer which has a simple design in combination with an accuracy of measurement which is improved compared with simple shadow-type measuring devices.

A further object is to provide an inclinometer which has a minimum of mechanical and optical parts and thus possesses greater ruggedness and impact resistance.

A further object of the present invention is to ensure structural integratability in geodetic devices or devices used in the building industry. This relates in particular to the use of existing electronic components as evaluation means.

Another object consists in the possibility of taking into account ageing and environmental effects, such as, for example, thermal changes.

These objects are achieved, according to the invention, by the defining features of claims 1 and 17, respectively, and the defining features of the subclaims.

The present invention relates to an optical inclinometer. A radiation source generates radiation by means of which a medium is focused onto a camera. The medium is held in a receptacle. This receptacle consists, for example, of a can for a liquid or a holder for a pendulum. The image need not correspond to an optically exact image. What is important is the transillumination of the receptacle with at least one first medium present therein or held by such receptacle. The image of this medium or of a part of this medium on the camera can optionally be evaluated by image processing so that, for example, imaging errors, such as, for example, distortions, can also be taken into account and corrected. In this context, imaging is therefore to be understood as meaning transillumination of the receptacle, in which an image of at least the first medium or of a part of the first medium is generated, which image can be evaluated by the camera.

The radiation used may be in the visible or nonvisible spectral range and is as a rule determined by the technical and physical parameters of radiation source, camera and medium. In addition to conventional lamps of various types, light emitting diodes or lasers, in particular semiconductor lasers, can also be used as the radiation source. Depending on the form of realization, the medium is transilluminated with this radiation or the medium serves for obscuring the radiation. The components of the image formed on the camera which are to be analyzed, or at least of parts of the medium, may now comprise light-dark transitions including the casting of a shadow of the medium on the camera, or an interface between two media. Depending on the specific design, the medium is chosen as a first medium tailored to a second medium so that, for example, a light-dark boundary is detectable as an effect of the transition or a particularly pronounced interface forms. In principle, the two effects are equally useful. In choosing the respective phase, the transmission ratios or the coefficients of transmission can also be adapted in the case of the media.

The first medium used for indicating the position may be a solid, liquid or a gas. The second medium may likewise have one of these phases but in principle an evacuated region may also be used here provided that a detectable boundary of the first medium remains. Some non-definitive examples of various embodiments are described below:

1. A pendulum as a first medium is present in a second gaseous medium. While the gaseous medium is permeable for the radiation, the pendulum is impermeable or transparent only to a limited extent so that the position of the pendulum and hence the inclination can be deduced from the image of the pendulum, which is reproduced as a zone of lower illumination on the camera.
2. Two hemispheres of solids of different coefficients of transmission and densities are connected to one another to give a sphere, which is rotatably mounted in a receptacle.
3. A liquid which is impermeable for the radiation, as a first medium, is enclosed together with a gas which is permeable for the radiation and insoluble in the liquid, as a second medium, in a container serving as a receptacle. The light-dark transmission between the two media is used for the evaluation, an evaluation of the light-dark transition also being possible in the case of two media having only slightly different permeability to the radiation.

4. A gas transparent for the radiation and a liquid which is likewise transparent are enclosed in a container, detection of the interface being effected. As a result of cohesion in the liquid, a curved line, instead of a straight one, forms in the transition region. On the basis of the curvature, it is possible to determine the side on which the liquid lies, so that the necessity of coloring one of the two media, in particular the liquid, can be dispensed with.

5. Two liquids not soluble in one another and having different densities but similar coefficients of transmission, as first and second medium, are enclosed in a container serving as a receptacle. The image of the interface between the two media is used for the evaluation.

Examples of liquids are mercury, water and silicone oil. For determining the position of the first medium, both the image of the interface and the light-dark transition or a combination of the two can be used. In order to achieve an intensification of the interface, the latter can be made easier to register by means of further measures. For example, it is possible to distribute over the interface floating particles which absorb the radiation more strongly in this region. It is also possible to place at the interface a float-like solid which in turn may be radiation-permeable or radiation-impermeable.

The image of the first medium or of the transition between the two media is projected onto the camera and recorded there and converted into electronic signals. For example, a CCD camera or a CMOS camera can serve as a suitable camera. Such a camera is obtainable, for example, as CMOS monochrome image sensor ADCS 2120 from Agilent and has a field of 640×480 pixels.

The signals generated by the camera are analyzed by an evaluation unit and evaluated with regard to the inclination of the device. A separate module or a separate component can be used for this purpose. Alternatively, however, it is also possible to rely on any existing components of other devices. For example, the functioning of the evaluation unit in an inclinometer installed in a distance-measuring instrument can also be performed by the electronics used for the distance measurement. Equally, it is possible also to use sources already used for other purposes as a radiation source. Thus, in the example of the distance-measuring instrument, a part of the laser light optionally used there for distance measurement could be divided off and, possibly after scattering or beam divergence, used for imaging of the medium.

The inclination of the device can be deduced from the relative and absolute position and the shape of the boundary between the two media. If, for example, a camera is mounted on a lateral surface of a rectangular container which is filled with a liquid, one direction of inclination (here, for example, the longitudinal tilt) can be determined from the angle of the liquid surface as a liquid horizon with the camera. If there is exclusively an inclination in the other axis (here, for example, a lateral tilt), the inclination can be determined from the height of the liquid level. Combined inclinations in two axes lead to a change in both the angle and the position in the sense of a height of the liquid horizon.

This imaging and evaluation can be carried out both with a pure light-dark transition and with an interface. In addition, analysis of the interface has even further advantages. Here, a system comprising a liquid and a gaseous medium according to the above example is to be considered, without restricting the applicability to other embodiments.

1. In contrast to the analysis of a pure light-dark transition, both transitions to the media can be evaluated at an interface, i.e. two edges are available.
2. A change in the lateral tilt of the above example leads to an increase or decrease in the width of the image of the interface. The width of the image can therefore also be used as information for determining the inclination. In particular, a self-calibration of the system can be achieved since—in the case of a horizontal beam path in the receptacle—the width of the image of the interface becomes minimal at a horizontal position of the device.
3. On exceeding a certain inclination limit, for example the lateral tilt, the camera in certain circumstances perceives a double interface, said interfaces being defined by the contact of the liquid with the vessel walls. The distance between these interfaces can serve, analogously to the width of the interface, as a measure of the inclination and can be correspondingly evaluated.
4. With the use of a wetting liquid as a first medium, this is drawn up by adhesion at the contact points of the container. On the basis of the curvature of the liquid horizon, it is possible to determine on which side of the container liquid is present. In the transverse direction, too, the liquid has a curvature so that, even in the absence of lateral tilt, two lines or horizons of the interface are always detectable. The lower one is the lowest point of the liquid and the upper one the wetting edge of the liquid with the inside of the receptacle. After a movement of the receptacle and also in a steady state, the lower line is substantially sharper and becomes stable more rapidly than upper wetting lines. In this context, detection of the interface and therefore of the position of the first medium can be effected not only on the basis of the horizontally aligned region but also by means of the curved region of the interface.
5. If an interface is made to be deformable as a function of the angle, for example by an air bubble in a spirit level with a specially curved surface, the inclination can likewise be deduced from the position and/or the deformation of the air bubble. Such a deformation can be achieved, for example, by making the curvature, for example, aspherical or tunnel-like, in contrast to the spherical shape. An air bubble present between this curvature and the liquid would then be deformed with increasing inclination.

By the use, according to the invention, of a camera, it is possible to resolve the properties and features of the image of the first medium and, therein in particular, the course and the position of the boundary or interface and to evaluate them. By means of the method according to the invention, it is therefore possible to carry out a correction or elimination of changes on the basis of ageing or environmental influences. Changes in the volume of the media can be taken into account without problems since, in the measurement of the longitudinal tilt, the course of the boundary or interface is detected in the image and the angle can be analyzed independently of the absolute position. Lateral tilt can be determined on the basis of the width of the image of the interface, it being possible for this process, as already described, to be associated with a self-calibration. This self-calibration can take place permanently in the background during the use of the inclinometer, so that a greater quantity of data records on inclination and width are available. The minimum value can be calculated from the values, optionally with the use of statistical or interpolation methods, and can be set equal to the horizontal position.

A precondition for determining the inclination on the basis of the width of the image of the interface is, however, a suitable vessel shape of the receptacle, which results in no level-related changes of the image of the interface. However, this requirement can be easily realized, for example by means of a vessel having parallel lateral walls. In particular, losses of a medium or density changes thereof can be compensated in this manner.

The method according to the invention and a device according to the invention are described in more detail below, purely by way of example, with reference to embodiments shown schematically in the drawing. Specifically, FIG. 1 shows the schematic diagram of a first embodiment of the inclinometer according to the invention, in side view;

FIG. 2a-d show the schematic diagram of the first embodiment in plan view and with different media;

FIG. 3a-c show the schematic diagram of the first embodiment of the inclinometer in the horizontal position and of the surface of the medium with an image on the camera, in plan view;

FIG. 4a-c show the schematic diagram of the first embodiment of the inclinometer in longitudinal tilt and of the surface of the medium with an image on the camera, in plan view;

FIG. 5a-e show the schematic diagram of the first embodiment of the inclinometer in a horizontal position in side view and plan view and of the surface of the medium with an image on the camera, in side view and plan view;

FIG. 6a-e show the schematic diagram of the first embodiment of the inclinometer in lateral tilt and in side view and plan view and of the surface of the medium with an image on the camera in side view and plan view;

FIG. 7a-d show the schematic diagram of a second embodiment of the inclinometer in a horizontal position and in side view and plan view and of the surface of the medium with an image on the camera in plan view; and FIG. 8a-e show the schematic diagram of a second embodiment of the inclinometer in lateral tilt and in side view and of the surface of the medium with an image on the camera in plan view for two differently shaped surfaces of the receptacle.

FIG. 1 shows, schematically as a side view, a first embodiment of the optical inclinometer according to the invention, with the integration of all components on a plate as a common base 1. Visible or nonvisible radiation S is emitted perpendicularly to the base 1 by a radiation source 2. The radiation S is collimated by a lens 3 and deflected again by a first deflecting element 4 and a second deflecting element 5 so that it is incident perpendicularly on the base 1. In the region of the incident radiation, a receptacle 6 having a first surface 7 oriented toward the base and a second surface 8 oriented toward the second deflecting element is mounted on the base 1. Between base 1 and the receptacle or the first surface 7 thereof there is a camera 9 which is connected to an evaluating unit 10. For reasons of compactness, the components associated with beam generation, with the beam path and with reception of the radiation are mounted on one side of the base 1, but the evaluating unit 10 is mounted on the opposite side of the base 1, but in principle another arrangement of the components for the evaluating unit 10 can also be chosen. This arrangement therefore has the advantage of the integration of all electronic components on a common base 1, which, for example, can also be in the form of a circuit board. As a result, a simple and mechanically insensitive design can be realized. The deflecting elements 4 and 5 can be in the form of reflecting components, for example prisms or mirrors. In principle, a suitable deflection can, however, also be achieved without special components, for example by reflection at the inside of a housing, it also being possible for this reflection to have a scattering or diffuse character. It is also possible to dispense with a deflection if it is ensured that at least parts of the receptacle 6 are illuminated by radiation S of the radiation-source 2 or camera 9. For example, such suitable orientation of radiation source 2 and receptacle 6 or camera 9 can also be realized by a curved or angled base 1. In principle, on dispensing with the mounting on a common base 1, however, direct mounting of the components one on top of the other can also be effected, as shown in a second embodiment according to the invention, in FIG. 7 and FIG. 8.

Figure 2A:
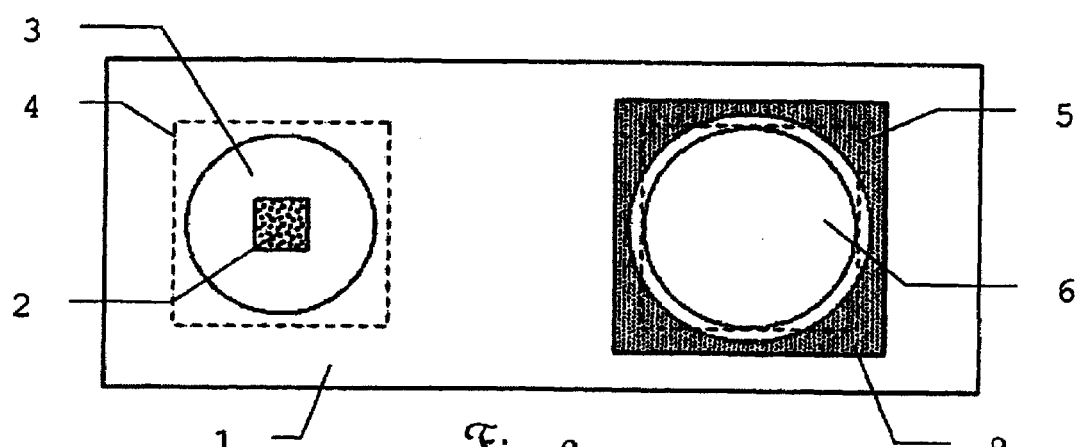

FIG. 2a shows this first embodiment of the inclinometer in plan view. The radiation emitted by the radiation source 2 is collimated by a lens 3 and passed via a first deflecting element 4 and a second deflecting element 5 onto the receptacle 6. This receptacle is mounted on a camera 9. In this embodiment, the radiation source 2 and the camera 9 are fastened to a substantially flat baseplate as base 1. The receptacle 6 contains at least one first medium. Possible embodiments are shown in FIG. 2b to FIG. 2d.

Figures 2B, 2C, 2D:
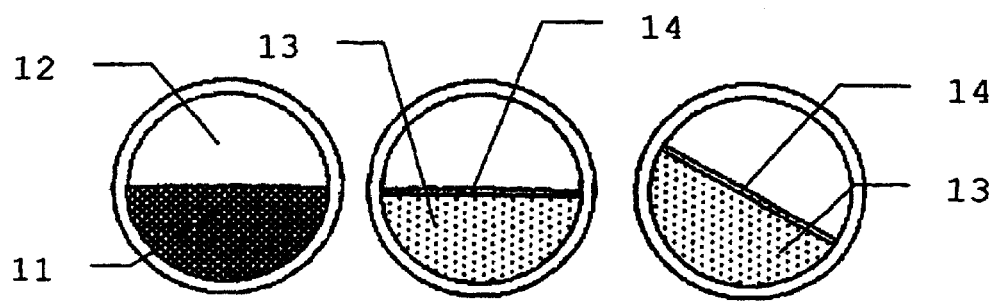

FIG. 2b shows the partial filling of the receptacle with a radiation-impermeable first medium 11 as a possible embodiment. The remaining region of the receptacle can be filled with a second medium 12, it being possible, however, for this second medium also to be replaced by a vacuum. In this embodiment comprising a radiation-impermeable first medium 11, the second medium 12 is chosen so that it is at least partly permeable to the radiation. This embodiment results in a light-dark contrast between the two media, which can be detected by the camera.

FIG. 2c shows a further embodiment of the filling of the receptacle with a radiation-permeable first medium 13. The remaining space of the receptacle can once again be filled with a second medium which, in this example, is likewise radiation-permeable. An interface 14, which is focused onto the camera and can be resolved by the latter, forms between the media. This interface 14 can be enhanced in its detectability, for example, by applying small particles, such as, for example, a powder, or more massive components, such as, for example, a float.

FIG. 2d shows the change in the position of the media in the receptacle at an inclination of the inclinometer. The change relative to the camera, which is fixed relative to the base, is shown. The schematically shown position corresponds to a rotation of the inclinometer shown in FIG. 2a in the counterclockwise direction and is designated as longitudinal tilt. While the positions of the media, shown in FIG. 2b and FIG. 2c, correspond to a horizontal position of the inclinometer, FIG. 2d shows the position detectable by the camera in the case of the described rotation of the inclinometer. As a result of the inclination, the radiation-permeable first medium 13 has shifted inside the receptacle. The changed position can be recognized and determined by the orientation of the interface 14.

FIG. 3a-c once again illustrates, in a synoptic presentation, the position and the detection of the interface in the horizontal, uninclined position of the inclinometer. In FIG. 3a, radiation is passed via the second deflecting element 5 to the receptacle 6 and, after passing through the volume of this receptacle, is focused onto the camera 9. The image of the media in the receptacle which is perceived by the camera is shown in FIG. 3b. Here, the radiation-permeable first medium 13 with its interface is still oriented horizontally relative to the camera. FIG. 3c schematically shows the image perceived by the camera. The image of the interface 16 is projected onto a detector surface 15 comprising lines and columns of image dots or pixels. By casting a shadow on the individual image dots, this image can be converted into signals, from which the position or orientation of the interface is derived. Compared with the inventive detection of a pure light-dark transition, for example as shown in FIG. 2b, which can likewise be realized in principle, the detection of an interface between two transilluminatable media offers the possibility of evaluating two edges in the image of the interface 16 for position determination. In addition to an evaluation of only the casting of a shadow on image dots, it is also possible to take into account further properties. Thus, a more exact resolution of the position of the interface can be achieved by the detection of gray values or by means of a color camera. In addition, further features, such as, for example, color changes due to refraction or scattering, can also be taken into account.

The change in the position of the interface in the case of an exclusive longitudinal tilt of the inclinometer or of the base 1 is shown schematically in FIG. 4a-c. FIG. 4a shows the rotation of the inclinometer relative to the perpendicular as a longitudinal tilt. The interface 14 remains unchanged in its absolute position and hence horizontally oriented relative to the vector of the gravitational force. As shown in FIG. 4b, however, the relative position of the interface 14 changes as a position relative to the base 1 or relative to the camera. The interface 14 is now inclined. The corresponding image of the interface 16 on the detector surface 15 is shown schematically in FIG. 4c, this image now having an inclination relative to the camera or to the detector surface.

FIG. 5a-e shows the situations in the case of a horizontally oriented inclinometer according to the invention, as a side view. FIG. 5a shows the inclinometer in plan view, whereas FIG. 5b shows a side view which, in FIG. 5a, corresponds to a view from the right. In FIG. 5b, the structure of the inclinometer is shown schematically in this side view. A camera 9 which indirectly or directly carries a receptacle 6 having a first surface 7 and a second surface 8 is mounted on the base 1. The evaluating unit 10 is mounted on the other side of the base 1. FIG. 5c shows an abstract representation of the side view of FIG. 5b after a rotation through 90° counterclockwise. Radiation S is incident from the left on the receptacle 6 with the radiation-permeable first medium 13 present therein. After passing through the receptacle, this radiation is incident on the camera 9 and thus produces an image of the interface 14 on the detector surface of the camera 9. FIG. 5d shows the position of the interface 14 relative to the camera. FIG. 5e shows the associated image of the interface 16 on the detector surface 15.

FIG. 6a-e show the diagram of one inclined inclinometer, the rotation being effected about an axis oriented perpendicularly to the previous rotation. A position resulting from such a rotation is referred to as lateral tilt. FIG. 6a shows the inclinometer in plan view. FIG. 6b shows the inclinometer as a side view. In FIG. 6c, it is evident that the interface 14 in the form of a liquid level here by way of example is now inclined in the receptacle 6 relative to the axis of incidence of the radiation S. Thus, as shown in FIG. 6d, the interface 14 appears broadened from the direction of view of the camera. As shown in FIG. 6e, the image of the interface 16' on the detector surface now likewise appears broadened so that a larger number of image dots is effected. The width of the image of the interface 16' and the lateral tilt of the inclinometer are correlated with one another so that the inclination can be deduced from this width.

FIG. 7a-d show a second embodiment of an inclinometer according to the invention, which, for example, can be used in plumb staffs or similar geodetic devices.

FIG. 7a schematically shows the structure of such an inclinometer, the inclinometer being in the horizontal position. The base 1' is substantially U-shaped and holds a radiation source 2 between the two limbs. The radiation source emits radiation S which is collimated by a lens 3. The collimated radiation S is then passed to the receptacle 6' which is mounted indirectly or directly on a camera 9. An evaluating unit is mounted on that side of the base 1' which is opposite the camera 9. The receptacle 6 has two surfaces, of which the first surface 7 is substantially plane whereas the second surface 8' has a curvature. The receptacle is filled with a liquid medium in which an air bubble is present as the second medium, it also being possible for other gases or optionally a further liquid to perform the function of the air bubble. Alternatively, however, another combination of media may also be suitable according to the invention. For example, instead of the air bubble, a mercury drop in an oil can be used, so that this drop, in contrast to the bubble does not float on the surface but remains at the bottom of the vessel. The respective specific design is dependent, inter alia, on constructional circumstances. Thus, for example, the use of a mercury drop would require the orientation of the arched second surface 8' in the direction of the ground.

FIG. 7b shows a plan view of the inclinometer, in which the radiation source 2 is merely indicated while omitting its holder. The radiation of this radiation source transilluminates the receptacle 6' and is incident on the camera 9 underneath, which is mounted on the base 1'.

FIG. 7c shows the view into the receptacle from the direction of the camera. In a radiation-permeable first medium 13', an air bubble 17 is detectable from its interface. Alternatively or in addition, further features of the air bubble 17, such as, for example, a change in the transmission ratio due to the distance covered in the radiation-permeable first medium 13' or a change in the transmission ratio due to a different coefficient of transmission of the air bubble, can also be used apart from the identification of the interface. The image of the interface 16" of the air bubble on the detector surface 15 of the camera is shown schematically in FIG. 7d.

FIG. 8a-e schematically shows the situations for lateral tilt of the inclinometer. FIG. 8a shows a tilting of the base 1' to the right, which thus corresponds to a lateral tilt. The air bubble 17 has now shifted to the left inside the receptacle 6'. This shift is also shown in FIG. 8b and FIG. 8c. FIG. 8b corresponds to a view from the direction of the camera onto the receptacle. The air bubble has now shifted to the left relative to the camera. The associated image of the interface 16" on the detector surface 15 is shown in FIG. 8c.

If the second surface of the receptacle is shaped in its curvature so that the air bubble is deformed depending on the degree of inclination, the inclination can be deduced from the shape or the change in shape of the image. A suitable shape could be, for example, an aspherical arch having a curvature increasing to a greater or lesser extent relative to a sphere. FIG. 8d and FIG. 8e show, by way of example, an aspherical shape having a radius of curvature which decreases toward the outside. With increasing inclination, the air bubble will thus acquire an increasingly elongated shape. FIG. 8d shows a view from the direction of the camera onto the receptacle. The air bubble has now shifted to the left relative to the camera and has an elongated shape. The associated image of the interface 16''' on the detector surface 15 is shown in FIG. 8e.

The embodiments shown represent only examples of realizations according to the invention and are therefore not to be understood as being definitive or limiting. Moreover, a person skilled in the art can derive further embodiments according to the invention, for example with the use of other beam paths or deflecting elements, such as, for example, prisms, scattering surfaces or optical waveguides, or alternative forms of the receptacle and of the media present therein. In particular, instead of fluid media, it is also possible to use pendulum-like solids or combinations of solids and fluid media.

In the figures, the image dots of the detector surface and in particular the number thereof are shown purely schematically. In the real embodiments, the number of image dots of available cameras is generally higher so that higher resolutions of the position or angle are achievable.

The invention claimed is:

1. An optical inclinometer comprising:
   a radiation source for producing radiation;
   at least one first medium whose position is inclination-dependent;
   a receptacle for the first medium;
   a camera for recording and converting an image into signals; and
   an evaluating unit for determining the inclination,
   the radiation source and camera being arranged so that an image of the course of an interface of at least a part of the first medium is reproduced indirectly or directly on the camera by the radiation, wherein the camera and the evaluating unit are formed so that the image is recorded by the camera and the course of the interface is resolved and the course of the interface is evaluated by the evaluating unit for determining the inclination.

2. The optical inclinometer as claimed in claim 1, wherein an image of the course of at least a part of a substantially flat interface of the first medium is reproduced indirectly or directly on the camera.

3. The optical inclinometer as claimed in claim 2, wherein the first medium is a liquid and the interface is a liquid horizon.

4. The optical inclinometer as claimed in claim 3, wherein the receptacle is designed as a cylindrical can.

5. The optical inclinometer as claimed in claim 2, wherein the inclinometer has, as a second medium, a gas, a liquid or a solid, whose contact surface with the first medium defines the interface.

6. The optical inclinometer as claimed in claim 5, wherein the first medium and the second medium have different transmission ratios for the radiation.

7. The optical inclinometer as claimed in claim 1, wherein the first medium is a pendulum-like solid.

8. The optical inclinometer as claimed in claim 1, wherein the radiation source has a semiconductor laser or an LED.

9. The optical inclinometer as claimed in claim 1, wherein radiation source and camera are arranged so that the radiation in the region of the first medium is passed substantially parallel to a surface of the first medium.

10. The optical inclinometer as claimed in claim 1, wherein the receptacle is mounted indirectly or directly on the camera.

11. The optical inclinometer as claimed in claim 1, wherein the receptacle has a first flat, transparent surface and a second transparent surface which are oriented substantially parallel to one another, the second surface being flat or arched.

12. The optical inclinometer as claimed in claim 11, wherein the camera has a two-dimensional detector surface which is oriented parallel to the first surface and/or to the second surface of the receptacle.

13. The optical inclinometer as claimed in claim 1, wherein radiation source and camera are mounted on a common base.

14. The optical inclinometer as claimed in claim 13, wherein radiation source and camera are arranged so that the radiation produced is emitted perpendicularly to the surface of the base and the receiving means of the camera is oriented perpendicularly to the surface of the base.

15. The optical inclinometer as claimed in claim 13, wherein a beam path from the radiation source to the camera has at least one deflecting element.

16. A geodetic device, in particular distance-measuring instrument or plumb staff, comprising an inclinometer as claimed in claim 1.

17. A method for measuring the inclination of a device, in particular of a geodetic device, comprising a radiation source for producing radiation; at least one first medium whose position is inclination-dependent; a receptacle for the first medium; a camera for recording images; and an evaluating unit for determining the inclination of the device, comprising the steps:
   production of an image on the camera by means of radiation produced by the radiation source, the image including the course of an interface of at least a part of the first medium,
   recording and conversion of the image into signals by the camera,
   determination of the inclination of the device from the signals by the evaluating unit,
   wherein the course of the interface is resolved and the course of the interface is evaluated for determining the inclination.

18. The method as claimed in claim 17, wherein the inclination of the device is determined from the orientation and shape of the interface.

19. The method as claimed in claim 17, wherein, in producing an image, the radiation is passed substantially parallel to a surface of the first medium.

20. The method as claimed in claim 17, wherein the determination of the inclination is effected taking into account, the angle of the first medium in the image, and the absolute position of the first medium in the image.

21. The method as claimed in claim 17, wherein a signal is output on reaching or exceeding a predeterminable inclination value.

22. The method as claimed in claim 17, wherein, in the determination of the inclination, errors due to temperature effects and/or substance losses of at least the first medium are taken into account, in particular eliminated.

23. The method as claimed in claim 17, wherein, in producing an image, a substantially flat interface of the first medium is reproduced.

24. The method as claimed in claim 23, wherein, in the determination of the inclination of the device, the extent, shape and/or position of the interface is taken into account.

25. The optical inclinometer as claimed in claim 1, wherein the camera is at least one of a CMOS or CCD micro-camera.

26. The optical inclinometer as claimed in claim 4, wherein the cylindrical can is half-full.

27. The optical inclinometer as claimed in claim 5, wherein the solid is in the form of a float.

28. The optical inclinometer as claimed in claim 6, wherein the first and second medium have different coefficients of transmission.

29. The optical inclinometer as claimed in claim 6, wherein one of the first medium or second medium is impermeable to the radiation.

30. The optical inclinometer as claimed in claim 13, wherein the common base is a circuit board.

* * * * *